US008182952B2

(12) United States Patent
Tanaka et al.

(10) Patent No.: US 8,182,952 B2
(45) Date of Patent: May 22, 2012

(54) FUEL CELL SYSTEM CAPABLE OF DRYING A FUEL CELL IN A SHORT TIME AFTER A SYSTEM STOP INSTRUCTION IS USED

(75) Inventors: Hiroaki Tanaka, Totota (JP); Kazuhiro Watanabe, Totota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 501 days.

(21) Appl. No.: 12/446,312

(22) PCT Filed: Oct. 29, 2007

(86) PCT No.: PCT/JP2007/071433
§ 371 (c)(1),
(2), (4) Date: Apr. 20, 2009

(87) PCT Pub. No.: WO2008/056617
PCT Pub. Date: May 15, 2008

(65) Prior Publication Data
US 2011/0003215 A1  Jan. 6, 2011

(30) Foreign Application Priority Data

Nov. 6, 2006  (JP) ................................. 2006-300664

(51) Int. Cl.
*H01M 8/04* (2006.01)
*H01M 8/06* (2006.01)
(52) U.S. Cl. ......... 429/429; 429/413; 429/414; 429/450
(58) Field of Classification Search ......................... None
See application file for complete search history.

(56) References Cited

U.S. PATENT DOCUMENTS

| 2003/0186093 | A1* | 10/2003 | St-Pierre et al. | 429/13 |
|---|---|---|---|---|
| 2005/0136297 | A1* | 6/2005 | Inai et al. | 429/13 |
| 2005/0257969 | A1* | 11/2005 | Osborne et al. | 180/65.3 |
| 2006/0121322 | A1* | 6/2006 | Haas et al. | 429/13 |
| 2007/0092771 | A1* | 4/2007 | Wake et al. | 429/22 |
| 2007/0298289 | A1* | 12/2007 | Clingerman et al. | 429/13 |

FOREIGN PATENT DOCUMENTS

| JP | 2002-208422 A | 7/2002 |
|---|---|---|
| JP | 2002-246054 A | 8/2002 |
| JP | 2002-343401 A | 11/2002 |
| JP | 2004-111196 A | 4/2004 |
| JP | 2004-146075 A | 5/2004 |
| JP | 2004-179100 A | 6/2004 |
| JP | 2004-265862 A | 9/2004 |
| JP | 2005-011779 A | 1/2005 |
| JP | 2005-251576 A | 9/2005 |

* cited by examiner

*Primary Examiner* — Nathan W. Ha
*Assistant Examiner* — Michael Jung
(74) *Attorney, Agent, or Firm* — Kenyon & Kenyon LLP

(57) ABSTRACT

There is disclosed a fuel cell system capable of drying a fuel cell in a short time after a system stop instruction is issued. The fuel cell system includes a controller to control the execution of a normal operation and a dry operation which decreases the water content of the fuel cell as compared with the normal operation. The controller executes the dry operation prior to the system stop instruction so that the water content of the fuel cell is decreased as compared with the normal operation at a time of the system stop instruction. The controller may execute the dry operation before the system stop instruction in a case where it is predicted that the temperature of the fuel cell at the system stop or the next system start is a predetermined low temperature.

15 Claims, 11 Drawing Sheets

FUEL CELL SYSTEM CAPABLE OF DRYING A FUEL CELL IN A SHORT TIME AFTER A SYSTEM STOP INSTRUCTION IS USED

This is a 371 national phase application of PCT/JP2007/071433 filed 29 Oct. 2007, which claims priority to Japanese Patent Application No. 2006-300664 filed 6 Nov. 2006, the contents of which are incorporated herein by reference.

TECHNICAL FIELD

The present invention relates to a fuel cell system including a fuel cell. More particularly, it relates to control for decreasing the water content of the fuel cell at a system stop.

BACKGROUND ART

A solid polymer type fuel cell generates a power by a chemical reaction between hydrogen in a fuel gas supplied to an anode and oxygen in an oxidizing gas supplied to a cathode. In this electrochemical reaction, water is formed on a cathode side. When the fuel cell is left to stand in the environment at a low temperature of 0° C. or less from the system stop to the next system start, the next system start is not satisfactorily performed or requires much time owing to the influence of the formed water which has frozen in the fuel cell.

Japanese Patent Application Laid-Open No. 2005-251576 discloses a control method for decreasing the water content of the fuel cell at the system stop so as to secure stable start properties even in the environment at the low temperature. In this control method, after the system stop is instructed, an outside air temperature sensor detects an outside air temperature, and the possibility of the freezing within 24 hours is judged based on the outside air temperature. Moreover, when the possibility of the freezing is present, the oxidizing gas is supplied to the fuel cell by an air compressor to discharge the water content from the fuel cell. Such scavenging processing of the fuel cell is performed until an electrolytic film dries up.

DISCLOSURE OF THE INVENTION

However, in a fuel cell system disclosed in Japanese Patent Application Laid-Open No. 2005-251576, after a system stop instruction is issued, processing for decreasing the water content of a fuel cell (the supply of an oxidizing gas) is performed, hence a wasteful power (energy) is consumed, and a long time for drying the fuel cell is required.

An object of the present invention is to provide a fuel cell system capable of drying a fuel cell in a short time after a system stop instruction is issued.

The fuel cell system of the present invention for achieving the above object includes a controller to control the execution of a normal operation and a dry operation which decreases the water content of a fuel cell as compared with the normal operation. The controller executes the dry operation before a system stop instruction so that the water content of the fuel cell is decreased at a time of the system stop instruction as compared with the normal operation.

According to this constitution, since the water content of the fuel cell is decreased before the system stop instruction, the water content of the fuel cell decreases at the time of the system stop instruction. In consequence, after the system stop instruction, the fuel cell can be dried in the short time. Moreover, a power required for drying the fuel cell can be saved.

Preferably, the controller may execute the dry operation before the system stop instruction in a case where it is predicted that the temperature of the fuel cell at the system stop or the next system start is a predetermined low temperature.

According to this constitution, the dry operation can be executed in accordance with a situation predicted at the system stop or the next system start. For example, in a case where the fuel cell has such a high temperature that there is not any possibility of freezing, the normal operation can be continued, and the dry operation can be avoided.

Here, "the predetermined low temperature" can be set to, for example, 0° C., or 2° C. which is safe from the freezing. Moreover, it can be predicted that the temperature of the fuel cell is "the predetermined low temperature", based on at least one of an outside air temperature, the lowest temperature within several days, a calendar or four seasons, geography or district, time zone and weather forecast. The data of the outside air temperature can be acquired with reference to external data acquired from intelligent transport systems (ITS) or the like, or internal data stored in a storage unit of the controller or the like.

Preferably, the controller may include a situation predicting unit which predicts a situation where the fuel cell system is disposed, and may execute the dry operation before the system stop instruction based on the prediction result of the situation predicting unit.

According to this constitution, the prediction result is used as a trigger, and the dry operation can be executed before the system stop instruction in accordance with the prediction of the situation. It is to be noted that the controller preferably determines the conditions of the dry operation based on the prediction result of the situation predicting unit to execute the dry operation.

More preferably, the situation predicting unit may be a stop instruction predicting section which predicts the system stop instruction. Moreover, the controller may execute the dry operation before the predicted system stop instruction in a case where it is predicted that the system stop instruction is issued, and may continue the normal operation in a case where it is predicted that the system stop instruction is not issued.

According to this constitution, since the prediction result of the system stop instruction is the trigger, the water content of the fuel cell can surely be decreased before the system stop instruction. Moreover, when the dry operation is not necessary before the system stop instruction, the dry operation can be avoided. It is to be noted that the normal operation may be continued until the system stop instruction is issued or until the next prediction concerning the system stop instruction is made.

More preferably, the stop instruction predicting section may predict the system stop instruction based on the position of a mobile body on which the fuel cell system is mounted and the use tendency of a user who uses the mobile body.

Further preferably, the controller may include a learning unit which learns the stop place of the mobile body and a stop time at the stop place to grasp the use tendency of the user.

According to these constitutions, when the user comes close to a place where the mobile body is frequently stopped for a long time (e.g., home or office), the system stop instruction can be predicted, so that the dry operation can be executed before the system stop instruction in accordance with the prediction. Moreover, since the use tendency of the user can be updated, the correctness (the hitting ratio) of the prediction of the system stop instruction can be improved.

It is to be noted that when the moving speed of the mobile body is taken into consideration during the prediction of the system stop instruction, the correctness further improves.

Moreover, the position of the mobile body can be measured by use of, for example, a global positioning system (GPS).

According to one preferable configuration of the present invention, after executing the dry operation before the predicted system stop instruction, the controller may switch the dry operation to the normal operation in a case where the stop instruction predicting section predicts that the system stop instruction is not issued, or when the system stop instruction is not issued within a predetermined time.

According to this constitution, the operation can appropriately return to the normal operation, and the power can appropriately be generated by the fuel cell in accordance with a request.

According to another configuration of the present invention, the situation predicting unit is a freeze predicting section which predicts the freezing of the fuel cell. Moreover, the controller may execute the dry operation before the system stop instruction in a case where it is predicted that the freezing of the fuel cell occurs, and may continue the normal operation in a case where it is predicted that the freezing of the fuel cell does not occur.

According to this constitution, as the prediction of the freezing is performed, any unnecessary dry operation can be avoided.

More preferably, the freeze predicting section may predict the freezing of the fuel cell at the system stop or the next system start based on at least one of the position of the fuel cell system, the outside air temperature, the predicted lowest temperature experienced within several days after the system stop and the calendar.

According to still another configuration of the present invention, the situation predicting unit may predict the tilt state of the mobile body on which the fuel cell system is mounted at the stop place of the mobile body.

According to this constitution, in a case where it is predicted that the tilt of the mobile body at the stop place is large, the dry operation can be executed before the system stop instruction. In consequence, even in a case where the mobile body is stopped at a tilt place where water is easily locally accumulated, the inside of the fuel cell can be brought into a state in which the water is not easily accumulated before the stop of the mobile body.

More preferably, the controller may include a learning unit which learns the stop place of the mobile body, a stop time at the stop place, and the tilt angle of the mobile body with respect to a road surface at the stop place to grasp the use tendency of the user. Moreover, the situation predicting unit predicts the stop place of the mobile body based on the use tendency of the user, and predicts the tilt state of the mobile body at the stop place.

According to this constitution, the operation can be switched to the dry operation before the stop of the mobile body at the tilt place based on past experience (the use tendency of the user).

According to one preferable configuration of the present invention, the controller may limit the amount of the power to be generated by the fuel cell as compared with the normal operation, to execute the dry operation.

According to this constitution, when the power generation of the fuel cell is limited, the water content of the fuel cell can be decreased while saving the power.

According to another preferable configuration of the present invention, the controller may raise the temperature of the fuel cell as compared with the normal operation, to execute the dry operation.

According to this constitution, the evaporation of the water content accumulated in the fuel cell can be promoted. In consequence, the water content in the fuel cell can preferably be carried away by a reactant gas (an oxidizing gas or a fuel gas) supplied to the fuel cell.

According to still another preferable configuration of the present invention, the fuel cell system includes a refrigerant piping system which supplies a refrigerant to the fuel cell, and during the dry operation, the fuel cell may be allowed to generate the power while the amount of the fuel cell to be cooled by the refrigerant is decreased.

Even according to this constitution, the evaporation of the water content accumulated in the fuel cell can be promoted, and the water content of the fuel cell can be decreased.

According to a further preferable configuration of the present invention, the fuel cell system includes an oxidizing gas piping system which supplies the oxidizing gas to the fuel cell, and the controller may change at least one of the flow rate, pressure, temperature and dew point of the oxidizing gas as compared with the normal operation, to execute the dry operation.

According to this constitution, a scavenging effect by the oxidizing gas improves, and the inside of the fuel cell can be dried.

According to a still further preferable configuration of the present invention, the fuel cell system includes a fuel gas piping system which supplies the fuel gas to the fuel cell, and the controller may change at least one of the flow rate, pressure, purge frequency and dew point of the fuel gas as compared with the normal operation, to execute the dry operation.

According to this constitution, the scavenging effect by the fuel gas improves, and the inside of the fuel cell can be dried.

BRIEF DESCRIPTION OF THE DRAWINGS

FIG. 7(A) shows a time axis and operation contents, and FIG. 7(B) is a graph showing the transition of the FC temperature;

BEST MODE FOR CARRYING OUT THE INVENTION

Hereinafter, a fuel cell system according to a preferable embodiment of the present invention will be described with reference to the accompanying drawings.

Figure 1:
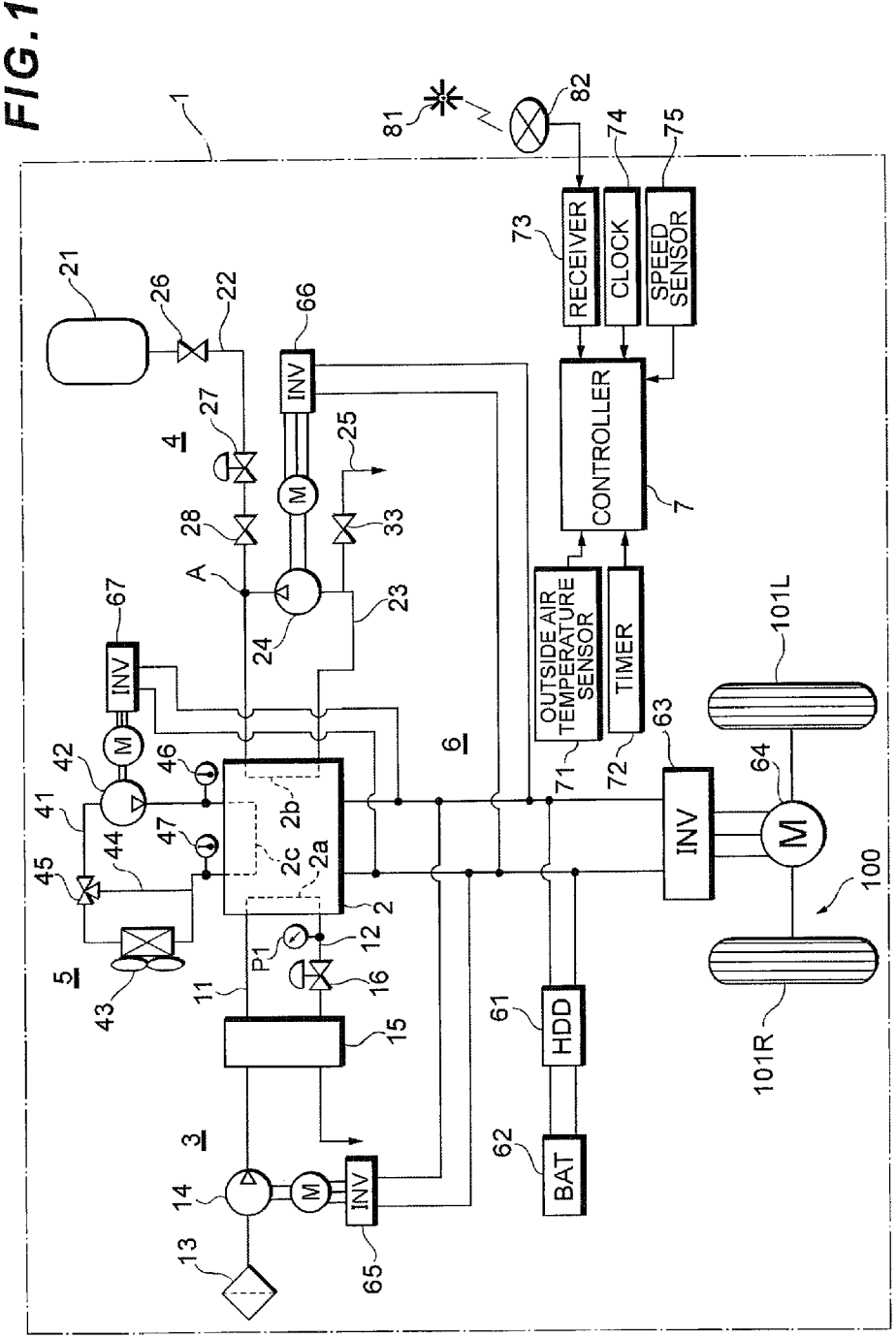
FIG. 1 is a constitution diagram of a fuel cell system of the present invention.

As shown in FIG. 1, a fuel cell system 1 can be mounted on a vehicle 100 such as a fuel cell car (FCHV), an electric car or a hybrid car. However, the fuel cell system 1 can also be applied to various mobile bodies (e.g., a ship, an airplane, a robot, etc.) other than the vehicle 100 or a stational power source.

The fuel cell system 1 includes a fuel cell 2, an oxidizing gas piping system 3 which supplies air as an oxidizing gas to the fuel cell 2, a fuel gas piping system 4 which supplies a hydrogen gas as a fuel gas to the fuel cell 2, a refrigerant piping system 5 which supplies a refrigerant to the fuel cell 2, a power system 6 which charges and discharges the power of the system 1, and a controller 7 which generally controls the operation of the system 1. The oxidizing gas and the fuel gas can generically be referred to as a reactant gas.

The fuel cell 2 is constituted of, for example, a solid polymer electrolyte type, and has a stack structure in which a large number of unitary cells are stacked. Each unitary cell has an air pole (a cathode) on one face of an electrolyte constituted of an ion exchange membrane, and a fuel pole (an anode) on the other face, and further has a pair of separators which sandwich the air pole and the fuel pole from both sides. The oxidizing gas is supplied to an oxidizing gas passage 2a of one separator, and the fuel gas is supplied to a fuel gas passage 2b of the other separator. The fuel cell 2 generates a power by an electrochemical reaction between the supplied fuel gas and oxidizing gas. The electrochemical reaction in the fuel cell 2 is a heat generating reaction, and the solid polymer electrolyte type fuel cell 2 has a temperature of about 60 to 80° C.

The oxidizing gas piping system 3 includes a supply path 11 and a discharge path 12. The oxidizing gas to be supplied to the fuel cell 2 flows through the supply path 11, and an oxidizing off gas discharged from the fuel cell 2 flows through the discharge path 12. The oxidizing off gas contains a water content formed by the cell reaction of the fuel cell 2, and hence has a highly wet state.

The supply path 11 is provided with a compressor 14 and a humidifier 15. The compressor 14 takes outside air through an air cleaner 13, and feeds the air under pressure to the fuel cell 2. The humidifier 15 performs water content exchange between the oxidizing gas flowing through the supply path 11 and having a lowly wet state and the oxidizing off gas flowing through the discharge path 12 and having the highly wet state, and the humidifier appropriately humidifies the oxidizing gas to be supplied to the fuel cell 2. A back pressure regulation valve 16 regulates the back pressure of the fuel cell 2 on an air pole side. The back pressure regulation valve 16 is arranged in the vicinity of a cathode outlet of the discharge path 12, and a pressure sensor P1 for detecting the pressure in the discharge path 12 is provided in the vicinity of the valve. The oxidizing off gas is discharged finally as an exhaust gas from the system to the atmosphere through the back pressure regulation valve 16 and the humidifier 15.

The fuel gas piping system 4 has a hydrogen supply source 21; a supply path 22 through which the hydrogen gas to be supplied from the hydrogen supply source 21 to the fuel cell 2 flows; a circulation path 23 which returns a hydrogen off gas (a fuel off gas) discharged from the fuel cell 2 to a joining part A of the supply path 22; a pump 24 which feeds under pressure, to the supply path 22, the hydrogen off gas in the circulation path 23; and a purge path 25 branched from the circulation path 23. When a source valve 26 is opened, hydrogen gas flowing from the hydrogen supply source 21 to the supply path 22 is supplied to the fuel cell 2 through a regulator valve 27 or another pressure reduction valve, and a block valve 28. The purge path 25 is provided with a purge valve 33 for discharging the hydrogen off gas to a hydrogen diluter (not shown).

The refrigerant piping system 5 has a refrigerant passage 41 which communicates with a cooling passage 2c in the fuel cell 2, a cooling pump 42 provided in the refrigerant passage 41, a radiator 43 which cools the refrigerant discharged from the fuel cell 2, a bypass passage 44 which bypasses the radiator 43, and a changeover valve 45 which sets the flow of cooling water through the radiator 43 and the bypass passage 44. The refrigerant passage 41 has, a temperature sensor 46 near a refrigerant inlet of the fuel cell 2, and a temperature sensor 47 near a refrigerant outlet of the fuel cell 2.

The cooling pump 42 is driven by a motor to circulate the refrigerant in the refrigerant passage 41 to the fuel cell 2. The refrigerant temperature detected by the temperature sensor 47 reflects the internal temperature of the fuel cell 2, that is, an in-cell temperature (hereinafter referred to as "the FC temperature"). Moreover, hereinafter, the temperature sensor 47 will be referred to as "the FC temperature sensor". However, an additional temperature sensor may separately be provided to directly detect the temperature of the fuel cell 2.

The power system 6 includes a high-pressure DC/DC converter 61, a battery 62, a traction inverter 63, a traction motor 64 and various auxiliary machine inverters 65, 66 and 67. The high-pressure DC/DC converter 61 is a direct-current voltage converter, and has a function of regulating a direct-current voltage input from the battery 62 to output the voltage to a traction inverter 63 side and a function of regulating a direct-current voltage input from the fuel cell 2 or the traction motor 64 to output the voltage to the battery 62. The charging/discharging of the battery 62 is realized by these functions of the high-pressure DC/DC converter 61. Moreover, the high-pressure DC/DC converter 61 controls the output voltage of the fuel cell 2.

The traction inverter 63 converts a direct current into a three-phase alternate current to supply the current to the traction motor 64. The traction motor 64 (a power generation device) is, for example, a three-phase alternate-current motor. The traction motor 64 constitutes, for example, a main power source of the vehicle 100 on which the fuel cell system 1 is mounted, and is connected to wheels 101L, 101R of the vehicle 100. The auxiliary machine inverters 65, 66 and 67 control the driving of motors of the compressor 14, the pump 24 and the cooling pump 42, respectively.

The controller 7 has a constitution of a microcomputer including therein a CPU, an ROM and an RAM. The CPU executes desired computation in accordance with a control program to perform various processing and control, for example, the control of a normal operation, a dry operation and a scavenging operation. The ROM stores the control program or control data to be processed by the CPU. The RAM is used mainly as various operation regions for control processing.

The controller 7 inputs detection signals from various sensors such as various pressure sensors (P1), temperature sensors (46, 47) and an accelerator open degree sensor which detects the accelerator open degree of the vehicle 100. Moreover, the controller 7 outputs control signals to constituent elements of the fuel cell system 1.

The controller 7 is connected to an outside air temperature sensor 71, a timer 72, a receiver 73, a clock 74 and a speed sensor 75, and each of them is mounted on the vehicle 100. The outside air temperature sensor 71 detects the outside air temperature of the environment where the fuel cell system 1 is disposed. The timer 72 variously measures a time necessary for controlling the operation of the fuel cell system 1. The timer 72 according to the present embodiment measures the stop time of the vehicle 100 which has stopped running.

The receiver 73 is, for example, a navigation device, and receives radio wave signals from a GPS satellite 81 or ITS through an antenna 82. For example, the receiver 73 receives positioning data indicating the position (i.e., a running position or a stop position) of the vehicle 100, and also receives past temperature transition data and predicted temperature transition data in a land where the vehicle 100 is disposed. The clock 74 acquires date data indicating the present date (calendar). The speed sensor 75 detects the running speed (the moving speed) of the vehicle 100. It is to be noted that when the receiver 73 or the controller 7 is provided with a function of a clock, the clock 74 does not have to be separately mounted on the vehicle 100.

Figure 2:
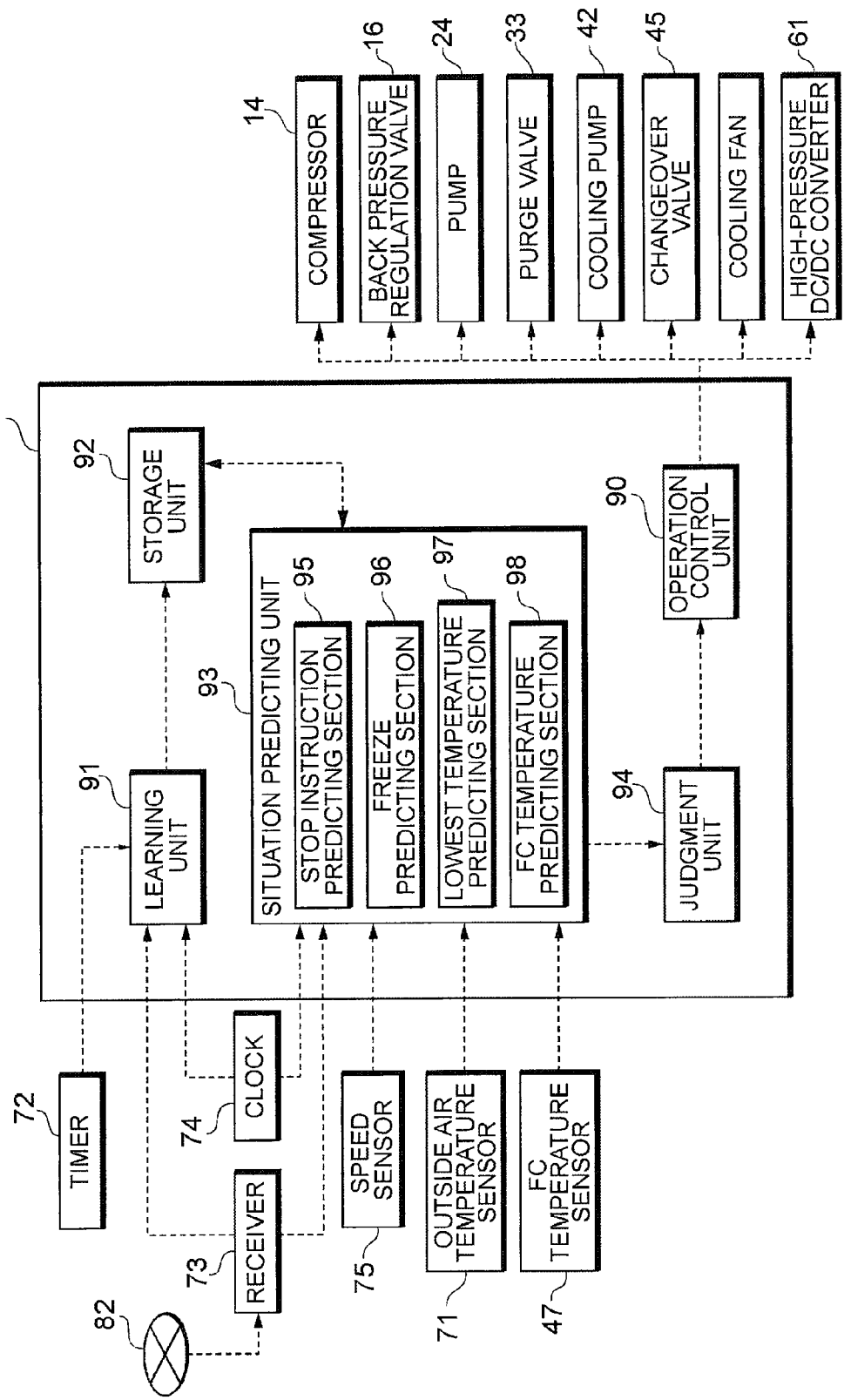
FIG. 2 is a block diagram showing a characteristic part of the fuel cell system of the present invention.

As shown in FIG. 2, in order to realize the dry operation before the system stop instruction, the controller 7 includes a learning unit 91, a storage unit 92, a situation predicting unit 93, a judgment unit 94, and an operation control unit 90.

Data from the timer 72, the receiver 73 and the clock 74 are input into the learning unit 91. The learning unit 91 learns the stop place of the vehicle 100 and the stop time at the stop place of the vehicle to grasp the use tendency of a user (an operator) who uses the vehicle 100. Specifically, the learning unit 91 learns a place where the user often stops the vehicle and the stop time of the vehicle based on the positioning data from the receiver 73 and vehicle stop time data from the timer 72, and the unit further learns a vehicle stop timing and a vehicle stop time zone based on the date data from the clock 74. Therefore, the learning unit 91 also learns a place where the user often goes in a season or the like (a ski area, a hot spring or the like in the winter). Through such learning, the learning unit 91 grasps the user's use tendency, that is, an operation pattern.

The storage unit 92 stores the user's use tendency grasped by the learning unit 91. For example, the storage unit 92 stores a plurality of places (e.g., home, office, shop and the like) where the user often stops the vehicle. The storage unit 92 preferably stores the vehicle stop place in association with the timing (four seasons) or the time zone (morning, afternoon and evening). For example, when the user uses the vehicle during commuting, the place of the office is stored in association with the time when the user comes to the office, and the place of the home is stored in association with the time when the user comes home. After the predetermined amount of the data is stored, the storage unit 92 preferably deletes the oldest data when storing new data, to store the data based on the latest action. Moreover, the storage unit 92 preferably has a map weighed by the probability (the frequency) of the vehicle stop, and the map is preferably updated through the learning in the learning unit 91 as needed. It is to be noted that the place where the frequency of the vehicle stop is high, and the timing and the time zone in that case can be stored in the storage unit 92 even by a user's input operation.

Data from the FC temperature sensor 47, the outside air temperature sensor 71, the receiver 73, the clock 74 and the speed sensor 75 are input into the situation predicting unit 93. The situation predicting unit 93 predicts a situation where the fuel cell system 1 is disposed in the future with reference to these input data and the data stored in the storage unit 92. For example, the future system stop instruction and freezing, further the lowest temperature and the FC temperature in the future and the like are predicted. Furthermore, in order to execute the prediction, the situation predicting unit 93 has a stop instruction predicting section 95, a freeze predicting section 96, a lowest temperature predicting section 97, and an FC temperature predicting section 98.

The stop instruction predicting section 95 predicts the system stop instruction of the fuel cell system 1 which is operating. The system stop instruction is an instruction to stop the operation of the fuel cell system 1. The system stop instruction is usually issued by the user's OFF operation of an ignition switch. The stop instruction predicting section 95 predicts the system stop instruction based on the positioning data from the receiver 73 and the user's use tendency data stored in the storage unit 92. For example, when the vehicle 100 comes close to the home, the stop instruction predicting section 95 predicts that the system stop instruction will be issued in near future. On the other hand, when the vehicle 100 comes away from the home as a destination, the stop instruction predicting section 95 predicts that any system stop instruction is not issued. Preferably, the stop instruction predicting section 95 also predicts the timing when the system stop instruction is issued, and also predicts the vehicle stop time in a case where the system stops after the system stop instruction.

In particular, the stop instruction predicting section 95 preferably predicts the system stop instruction even in consideration of vehicle speed data from the speed sensor 75. In a case where the vehicle speed is, for example, 20 km/h or less near the vehicle stop place having a high frequency which is stored in the storage unit 92, there is a high possibility that the vehicle 100 is stopped in a parking place. Therefore, in this case, the stop instruction predicting section 95 predicts that the system stop instruction is issued. On the other hand, in a case where any deceleration is not performed and the vehicle speed is 50 km/h or more even near the vehicle stop place having the high frequency which is stored in the storage unit 92, there is a high possibility that the vehicle 100 passes in front of the parking place. Consequently, in this case, the stop instruction predicting section 95 predicts that any system stop instruction is not issued. When the vehicle speed data is taken into consideration in this manner, the hitting probability of the prediction of the system stop instruction can be improved.

The freeze predicting section 96 predicts the freezing of the fuel cell 2. Here, the freezing of the fuel cell 2 is caused, when the fuel cell 2 is exposed in the environment at a low temperature (below the freezing point) while the water content remains in the fuel cell 2. The possibility of the freezing is low for the reason of the management of an operation temperature during the power generation of the fuel cell 2. However, when the fuel cell is exposed in the environment below the freezing point after the system stop, the water content in the fuel cell 2 freezes, and therefore the freezing of the fuel cell 2 occurs. The freeze predicting section 96 predicts the freezing of the fuel cell 2 at the system stop or the next system start based on "predetermined information".

Here, "the predetermined information" is at least one, preferably several pieces of the position (geographical coordinates) of the vehicle 100, the outside air temperature, a predicted temperature including the predicted lowest temperature experienced for a predetermined period after the system stop, predicted weather and the calendar. Here, the predicted temperature may be a temperature at the scheduled stop place (the destination) of the vehicle 100. The data of the predicted temperature may be external data received from the ITS through the receiver 73 or internal data predicted by the FC temperature predicting section 98. The predicted lowest temperature may be a temperature experienced within 24 hours or several days after the system stop. The data of the predicted lowest temperature may be external data similarly received from the ITS or internal data predicted by the lowest temperature predicting section 97. As the data of the predicted weather, data received from the ITS may be used. Moreover, as the data of the calendar, timing data and time zone data from the clock 74 may be used.

When the predicted lowest temperature at the scheduled stop place of the vehicle 100 is, for example, 0° C. or less, the freeze predicting section 96 predicts that the fuel cell 2 might freeze at the system stop or the next system start. On the other hand, the predicted lowest temperature at the scheduled stop place of the vehicle 100 exceeds 5° C., the freeze predicting section 96 predicts that the fuel cell 2 might not freeze at the system stop or the next system start. Preferably, the freeze predicting section 96 predicts the degree of the freezing level of the fuel cell 2, that is, the rank of preparation for low-temperature start.

The lowest temperature predicting section 97 predicts the predicted lowest temperature experienced by the vehicle 100 within 24 hours or several days after the system stop. This prediction is performed based on the scheduled stop place of the vehicle 100, the positioning data of the present place, the outside air temperature data from the outside air temperature sensor 71, the calendar data from the clock 74 and the like.

The FC temperature predicting section 98 predicts the internal temperature of the fuel cell 2 at the system stop or the next system start. This prediction is performed based on the outside air temperature data from the outside air temperature sensor 71 and/or the predicted lowest temperature data obtained by the lowest temperature predicting section 97. It is to be noted that when the system stop time is long, the FC temperature predicted by the FC temperature predicting section 98 agrees with the predicted temperature of the environment where the vehicle 100 is exposed.

The judgment unit 94 judges, based on the prediction result obtained by the situation predicting unit 93, how an operation should be performed. Specifically, the judgment unit 94 judges whether to continue a normal operation or to switch to a dry operation, based on the prediction result of the stop instruction predicting section 95 or the freeze predicting section 96. For example, in a case where the stop instruction predicting section 95 predicts that the system stop instruction is issued or the freeze predicting section 96 predicts that the freezing occurs, it is judged that an operation should be switched to the dry operation before the system stop instruction.

The operation control unit 90 is informed of the judgment result from the judgment unit 94. The operation control unit 90 controls various constituent apparatuses (the compressor 14, the back pressure regulation valve 16, the pump 24, the purge valve 33, the cooling pump 42, the changeover valve 45, a cooling fan for the radiator 43, the high-pressure DC/DC converter 61, etc.) of the fuel cell system 1 based on the judgment result, to execute the normal operation or the dry operation. Moreover, the operation control unit 90 controls the various constituent apparatuses of the fuel cell system 1 to execute a scavenging operation of the fuel cell 2.

Here, the normal operation, the dry operation and the scavenging operation will be described.

During the normal operation, to suppress a power loss and obtain a high power generation efficiency, the fuel cell 2 is operated (allowed to generate the power) while an air stoichiometric ratio is set to 1.0 or more (a theoretical value). Here, the air stoichiometric ratio is an oxygen surplus ratio, and indicates the surplus ratio of supplied oxygen with respect to oxygen necessary for reacting with hydrogen without excess or deficiency.

The dry operation is an operation for decreasing the water content of the fuel cell 2 as compared with the normal operation. In other words, during the dry operation, request outputs set by various parameters are output by the fuel cell 2 to obtain an operation state in which the inside of the fuel cell 2 more easily dries as compared with the normal operation. In this respect, the scavenging operation is included in the concept of the dry operation. During the dry operation, a humidity in the fuel cell 2 (the electrolytic film, a diffusion layer or the passage) does not have to be necessarily set to 0%, and the water content may only be decreased. When the dry operation is executed, the electrolytic film tends to dry as compared with the normal operation. The dry operation can be executed by various methods, when using a value which is different from the value of the control parameter used during the normal operation.

Specifically, in a first example, the dry operation is executed by limiting the amount of the power to be generated by the fuel cell 2 as compared with the normal operation. This can be realized, when the high-pressure DC/DC converter 61 limits the maximum output of the fuel cell 2. With such a dry operation, the water content of the fuel cell 2 can be decreased while saving the power.

In a second example, the dry operation is executed by raising the FC temperature as compared with the normal operation. This can be realized by the heating performed by an external heating device, the increase of the self heating amount of the fuel cell 2 or the decrease of the cooling amount of the fuel cell 2. Control for increasing the self heating amount of the fuel cell 2 can be executed, for example, when lowering the stoichiometric value of the reactant gas (the oxidizing gas or the fuel gas) or the like to lower a power generation efficiency. The decrease of the cooling amount of the fuel cell 2 can be realized, when controlling the rotation number of the cooling pump 42 and/or the rotation number of the cooling fan for the radiator 43 to control the cooling amount in the radiator 43 or switching the changeover valve 45 to the bypass passage 44 side, while the fuel cell 2 is allowed to generate the power. With such a dry operation performed, the evaporation of the water content accumulated in the fuel cell 2 can be promoted, and the evaporated water content can be carried away by the oxidizing off gas or the fuel off gas.

In a third example, the dry operation is executed by changing at least one of the flow rate, the pressure, the temperature and the dew point of the oxidizing gas as compared with the normal operation. Specifically, the dry operation is performed by increasing the rotation number of the compressor 14 to increase the flow rate of the oxidizing gas, regulating the open degree of the back pressure regulation valve 16 to decrease the supply pressure of the oxidizing gas, raising the temperature of the oxidizing gas by an external heater (not shown), or lowering the dew point. With such a dry operation performed, the inside of the fuel cell 2 can be dried with good response. It is to be noted that during the dry operation, the humidifier 15 may be bypassed to supply the oxidizing gas to the fuel cell 2, or the amount of the oxidizing gas to be humidified by the humidifier may be controlled and decreased.

In a fourth example, the dry operation is executed by changing at least one of the flow rate, the pressure, the purge frequency and the dew point of the fuel gas as compared with the normal operation. Specifically, the dry operation is performed by regulating the pump 24 and/or an injector (not shown) to increase the flow rate of the fuel gas, regulating the regulator valve 28 or the injector to lower the supply pressure of the fuel gas, increasing the purge frequency of the purge valve 33, or lowering the dew point. With even such a dry operation executed, the inside of the fuel cell 2 can be dried.

It is to be noted that the above first to fourth examples may appropriately be combined to execute the dry operation.

The scavenging operation is an operation for discharging the water content from the fuel cell 2 to the outside to scavenge the inside of the fuel cell 2 at the end of the operation of the fuel cell system 2 (at the system stop). In the present embodiment, the scavenging operation is executed after the system stop instruction is issued. The scavenging operation is performed, for example, by supplying the oxidizing gas to the oxidizing gas passage 2a by the compressor 14 and carrying away the water content remaining in the fuel cell 2 by the oxidizing gas, while the fuel cell 2 is brought into an idle operation or the supply of the hydrogen gas to the fuel cell 2 is stopped.

Next, concerning the stop control of the fuel cell system 1 by the controller 7, a plurality of examples will be described.

<First Control Example>

Figure 3:
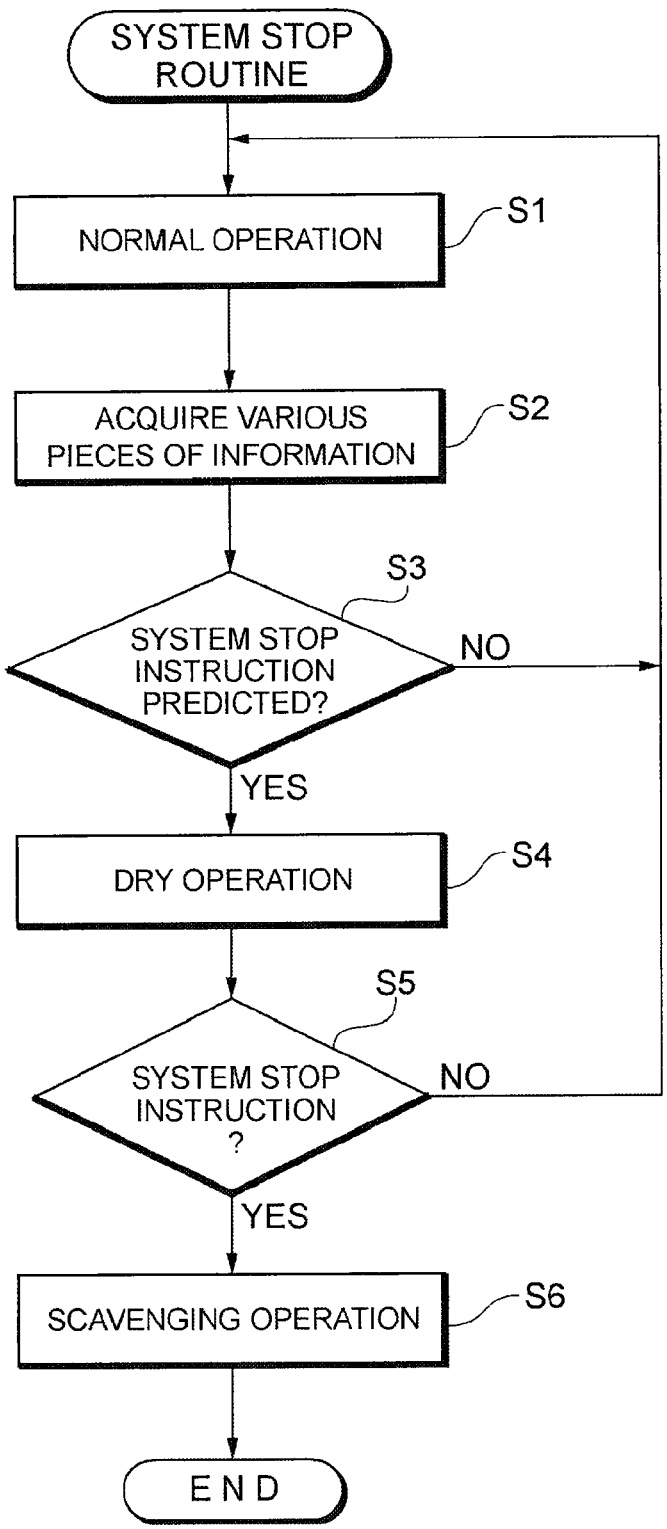
FIG. 3 is a flow chart showing a first control example concerning the stop control of the fuel cell system of the present invention.

As shown in FIG. 3, the fuel cell system 1 executes the normal operation (step S1). During the normal operation, there are acquired various pieces of information including the outside air temperature data, the FC temperature data, the vehicle speed data, the positioning data and the time data such as a season (step S2). These data are acquired as needed during the normal operation. Next, the stop instruction predicting section 95 predicts whether or not the system stop instruction is issued by the user (step S3). As described above, this prediction is performed with reference to the positioning data, and the user's use tendency data of the storage unit 92, preferably even with reference to the vehicle speed data.

In a case where it is predicted that any system stop instruction is not issued (step S3; NO), the judgment unit 94 judges that the normal operation should be continued, and sends a signal indicating this effect to the operation control unit 90. In consequence, the operation control unit 90 controls various apparatuses so that any dry operation is not performed but the normal operation is continued (step S1).

On the other hand, in a case where it is predicted that the system stop instruction is issued (step S3; YES), the judgment unit 94 judges that the dry operation should be executed, and sends a signal indicating this effect to the operation control unit 90. In consequence, the operation control unit 90 controls various apparatuses so that the normal operation is switched to execute the dry operation (step S4). Consequently, the water content of the fuel cell 2 is decreased as compared with the normal operation.

In the next step S5, it is judged whether or not the system stop instruction has been issued within a predetermined time. As described above, this predetermined time is a time when the system stop instruction predicted by the stop instruction predicting section 95 is issued. In a case where the system stop instruction is not issued by the user even after the elapse of this predetermined time (step S5; NO), the operation is switched to the normal operation again (step S1).

On the other hand, when the system stop instruction is issued within the predetermined time as predicted (step S5; YES), the dry operation is switched to the scavenging operation by use of the system stop instruction as a trigger (step S6). By this scavenging operation, the water content remaining in the fuel cell 2 is completely or substantially completely carried away, and the electrolytic film and electrodes of the fuel cell 2 are dried. Afterward, the fuel cell system 1 stops to prepare for the next start.

As described above, according to the first control example of the present embodiment, since the dry operation is performed before the system stop instruction, the water content of the fuel cell 2 can be decreased at a time of the system stop instruction. In consequence, after the system stop instruction, the fuel cell 2 can be scavenged (dried) in a short time. Moreover, since a time required for the scavenging operation shortens, the power required for drying the fuel cell 2 can be saved, and an energy efficiency can be increased. In addition, the switching to the dry operation or the continuing of the normal operation is executed by using the prediction result of the system stop instruction as the trigger. In consequence, when the dry operation before the system stop instruction is not necessary, the dry operation can be avoided. Thus, the operation can be performed in accordance with the situation of the fuel cell system 1.

It is to be noted that between the above steps S4 and S5, there may be provided a step of judging again whether or not the system stop instruction is predicted by the stop instruction predicting section 95 (i.e., the step corresponding to the step S3). In a case where this step is provided, when the system stop instruction is predicted by the stop instruction predicting section 95, the step may advance to the step S5. Conversely, when the system stop instruction is not predicted, the step may return to the step S1 to switch to the normal operation.

Although not described in detail, in a case where the system stop instruction issued by the user is interrupted before predicting that the system stop instruction is issued, the normal operation is switched to the scavenging operation.

<Second Control Example>

Figure 4:
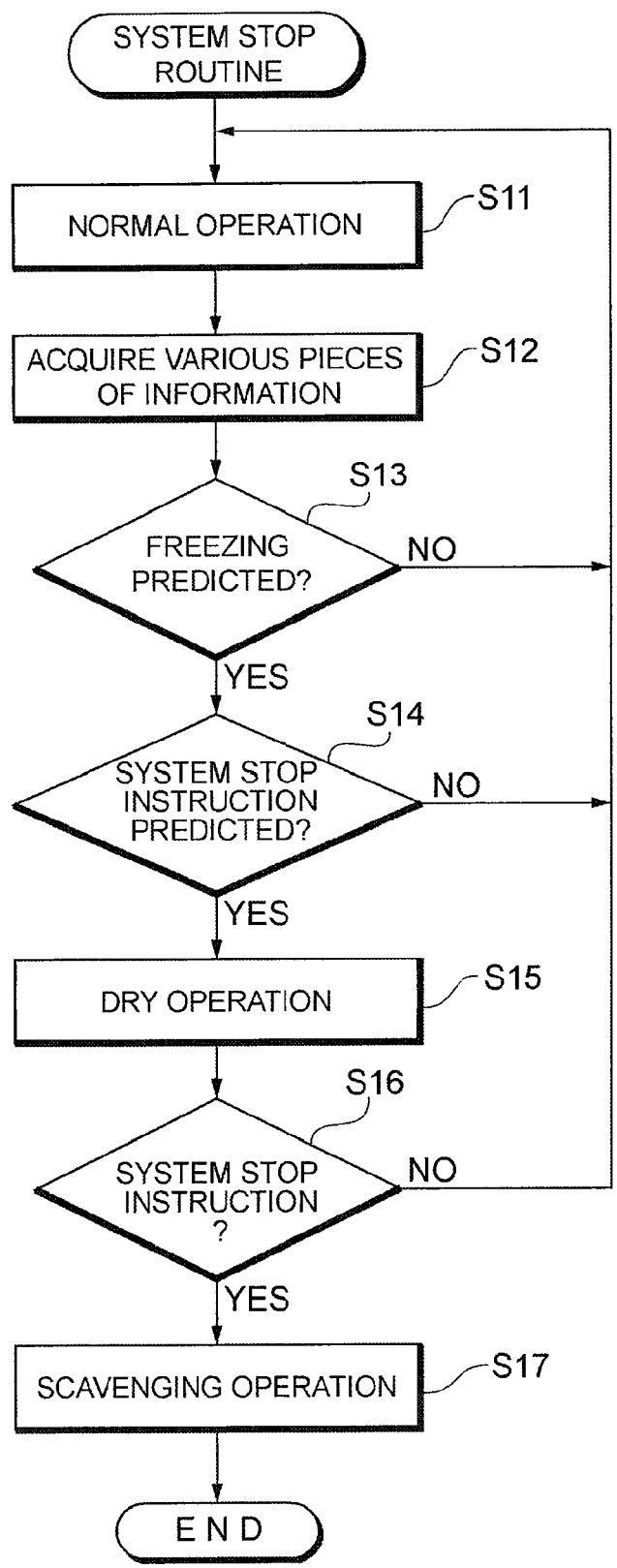
FIG. 4 is a flow chart showing a second control example concerning the stop control of the fuel cell system of the present invention.

Next, a second control example will be described with reference to FIG. 4. The example is different from the first control example in that the judgment of freeze prediction (step S13) is added. It is to be noted that steps S11, 12 and S14 to 17 are the same as the steps S1 to 6 of FIG. 3, and hence the description thereof is omitted.

In the step S13, the freeze predicting section 96 predicts whether or not the freezing of the fuel cell 2 occurs at the system stop or the next system start.

In a case where it is predicted that the freezing occurs or that the FC temperature at the system stop or the next system start is a predetermined low temperature (step S13; YES), the processing advances to the step S14. Here, the predetermined low temperature can be set to 0° C. or less (a freezing point) at which the freezing of the fuel cell 2 occurs, or a temperature (e.g., 2° C. or less) which is safer from the freezing.

In a case where it is predicted that such freezing occurs (the step S13; YES), the freeze predicting section 96 preferably predicts the rank of the freezing level of the fuel cell 2. As the FC temperature at the system stop or the next system start is low, much time is required for unfreezing in the case of the freezing. For example, it is predicted that the freezing level is higher at −20° C. than at −10° C.

Afterward, the processing advances in the same manner as in the first control example, and it is predicted in the step S14 whether or not the system stop instruction is issued. In a case where it is predicted that the system stop instruction is issued (step S14; YES), the dry operation (step S15) is executed. This dry operation (step S15) or the subsequent scavenging operation (step S17) may be executed in accordance with the above prediction of the freezing level. For example, as the freezing level is low, the dry degree of the dry operation may be decreased, or the scavenging time of the scavenging operation may be shortened.

On the other hand, in a case where it is predicted that the freezing does not occur or it is predicted that the FC temperature at the system stop or the next system start exceeds the predetermined low temperature (step S13; NO), the normal operation is continued. In this case, when the system stop instruction issued by the user is interrupted, the normal operation is switched to the scavenging operation.

As described above, according to the second control example, in addition to the function or effect obtained by the first control example, the dry operation can be executed or the normal operation can be continued in accordance with the predicted freezing situation at the system stop or the next system start. Therefore, it is possible to secure the stable start properties of the fuel cell system 1 in the environment at the low temperature, for example, below the freezing point. In addition, the conditions of the dry degree can be determined in accordance with the predicted freezing level rank to execute the dry operation. On the other hand, in the environment where any freezing does not occur, the normal operation can be continued, and the dry operation can be avoided.

It is to be noted that in another embodiment, the freeze prediction (step S13) may be performed after the prediction of the system stop instruction (step S14). Moreover, in still another embodiment, the prediction of the system stop instruction (step S14) does not have to be performed. That is, in a case where it is predicted that the freezing occurs (step S13; YES), the dry operation may be executed regardless of the prediction of the system stop instruction (step S15).

<Third Control Example>

Next, a third control example will be described with reference to FIGS. 5 to 7. The third control example indicates the specific example of the dry operation. It is to be noted that in the following description, the detailed description of steps common to those of the first or second control example is omitted.

First, in a step S21, the power generation of the fuel cell 2 starts, and the state of the normal operation is achieved. The FC temperature is then measured (S22). Furthermore, the lowest temperature (the air temperature) experienced by the vehicle 100 within several days is estimated (step S23). This estimation can be performed by the lowest temperature predicting section 97. Then, the judgment unit 94 judges from the estimated (predicted) lowest temperature whether or not the dry operation needs to be performed (step S24). When the dry operation does not have to be performed (step S24; NO), the flow comes out of the processing.

When the dry operation is necessary (step S24; YES), the target value of the FC temperature (the cooling water temperature) in the dry operation is determined (step S25). This target value is determined with reference to, for example, a map M1 shown in FIG. 6.

Figure 6:
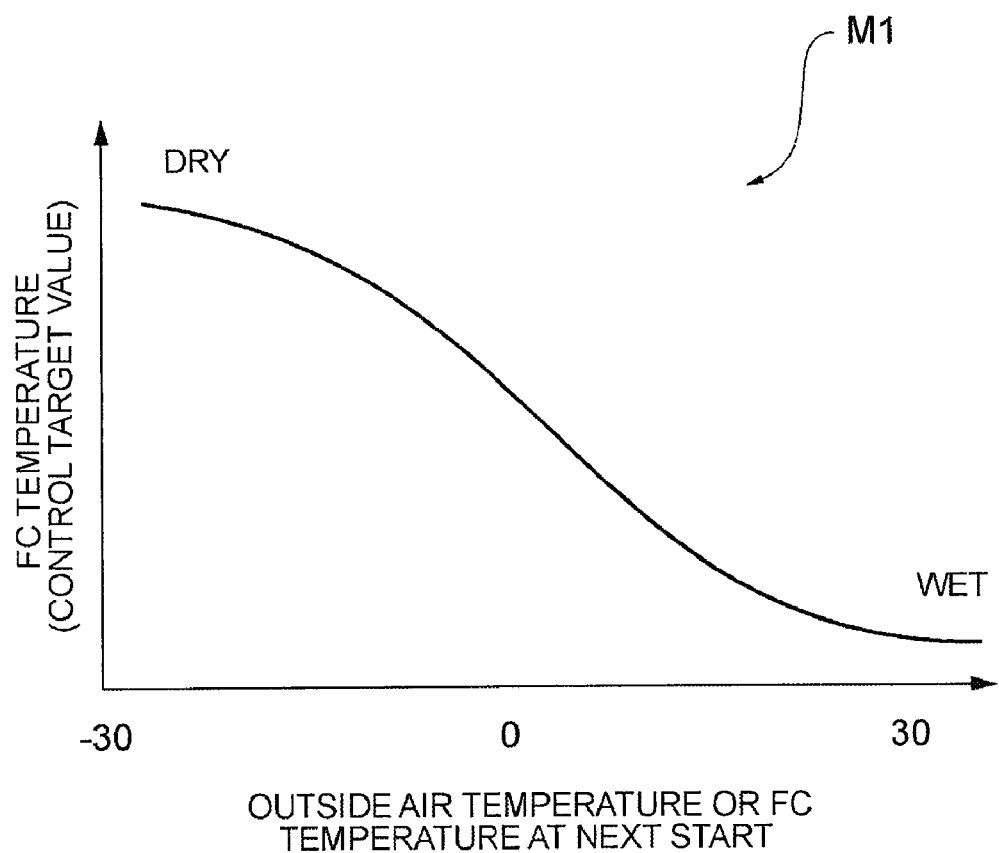
FIG. 6 is a map showing a relation between an FC temperature as a control target value and an outside air temperature or an FC temperature at the next start.
Figure 7:
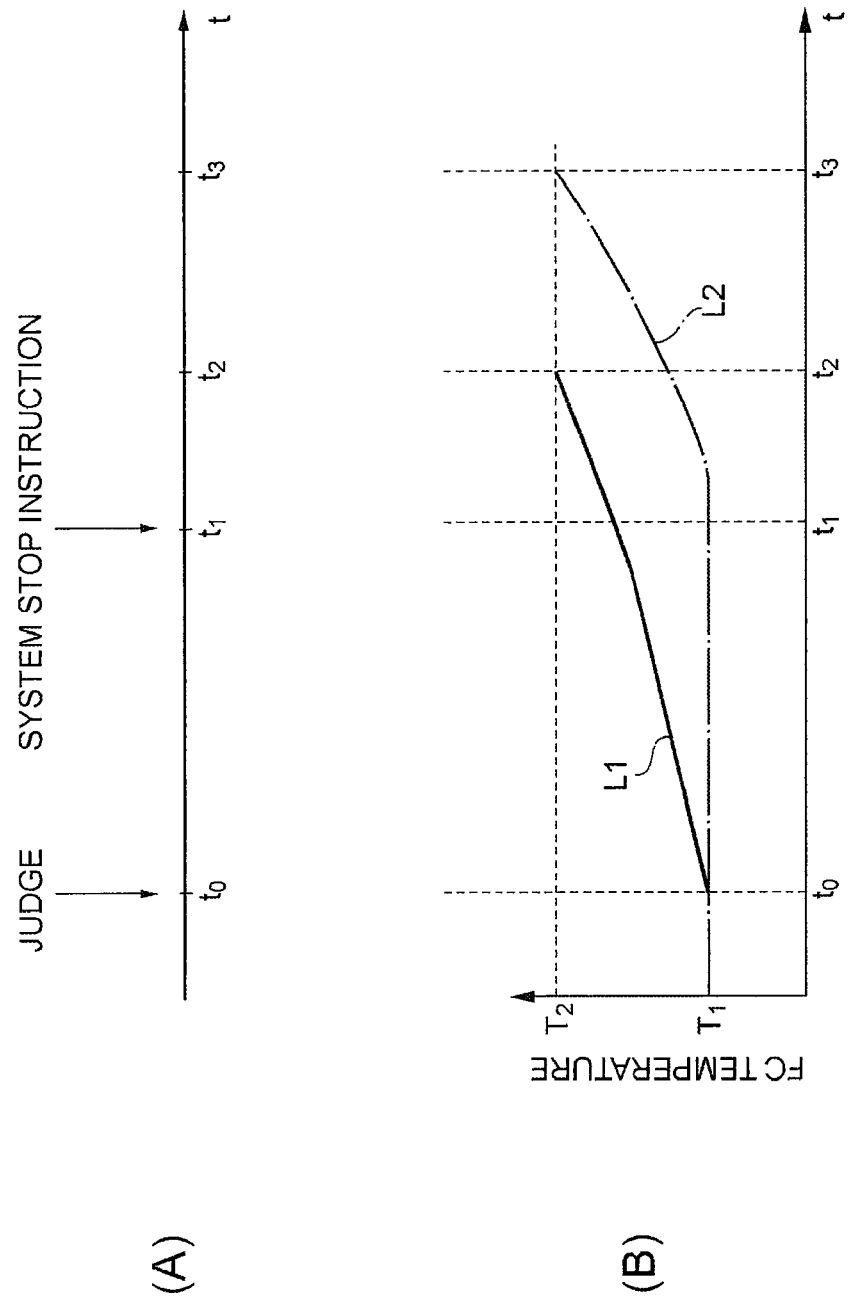
FIG. 7 is a diagram showing a relation between the FC temperature and a time in a case where the third control example of the present invention and a comparative example are executed.

The map M1 shown in FIG. 6 indicates a relation between the FC temperature as a control target value and the outside air temperature or the FC temperature at the next start. Here, the outside air temperature is an outside air temperature at the present time, and the FC temperature at the next start is a temperature predicted by the FC temperature predicting section 98. In this map M1, when the outside air temperature or the FC temperature at the next start is low, the corresponding FC temperature target value increases. That is, the target value of the FC temperature is set to a large value so as to raise the FC temperature during the dry operation, as the observed outside air temperature or the predicted FC temperature is low. In consequence, at the system stop, an MEA of the fuel cell 2 easily dries. Conversely, when the observed outside air temperature or the predicted FC temperature is high, the target value of the FC temperature is set to a small value. It is to be noted that the abscissa of the map M1 may indicate the lowest temperature predicted in the step S23 instead of the outside air temperature or the FC temperature at the next start.

Next, to obtain the FC temperature determined in the step S25, the normal operation is switched to the dry operation, and the FC temperature is actually controlled (step S26). The FC temperature can be changed by controlling the cooling amount by the radiator 43, or the changeover valve 45. To raise the FC temperature, as in the above second example of the dry operation, while the fuel cell 2 is allowed to generate the power, the cooling amount by the radiator 43 is controlled, or the changeover valve 45 is switched to the bypass passage 44 side, to raise the cooling water temperature of the fuel cell 2.

Afterward, when the system stop instruction is issued within the predetermined time (step S27; YES), the scavenging operation (step S28) is executed. On the other hand, in a case where the system stop instruction is not issued even after the elapse of this predetermined time or it is predicted that any system stop instruction is not issued (step S27; NO), the flow preferably comes out of the processing and returns to the normal operation.

The above-mentioned effect of the third control example will be described with reference to FIG. 7.

A curve L1 shown in FIG. 7(B) indicates the transition of the FC temperature in a case where the third control example is performed, and a curve L2 indicates the transition of the FC temperature in a case where a comparative example is performed.

As shown in the curve L2, in the comparative example, when the system stop instruction is issued by the user (a timing $t_1$), the dry operation for raising the FC temperature is executed. In consequence, an FC temperature $T_1$ before the dry operation reaches a target temperature $T_2$ at a timing $t_3$, and a predetermined time $(t_3-t_1)$ elapses from the system stop instruction.

Figure 5:
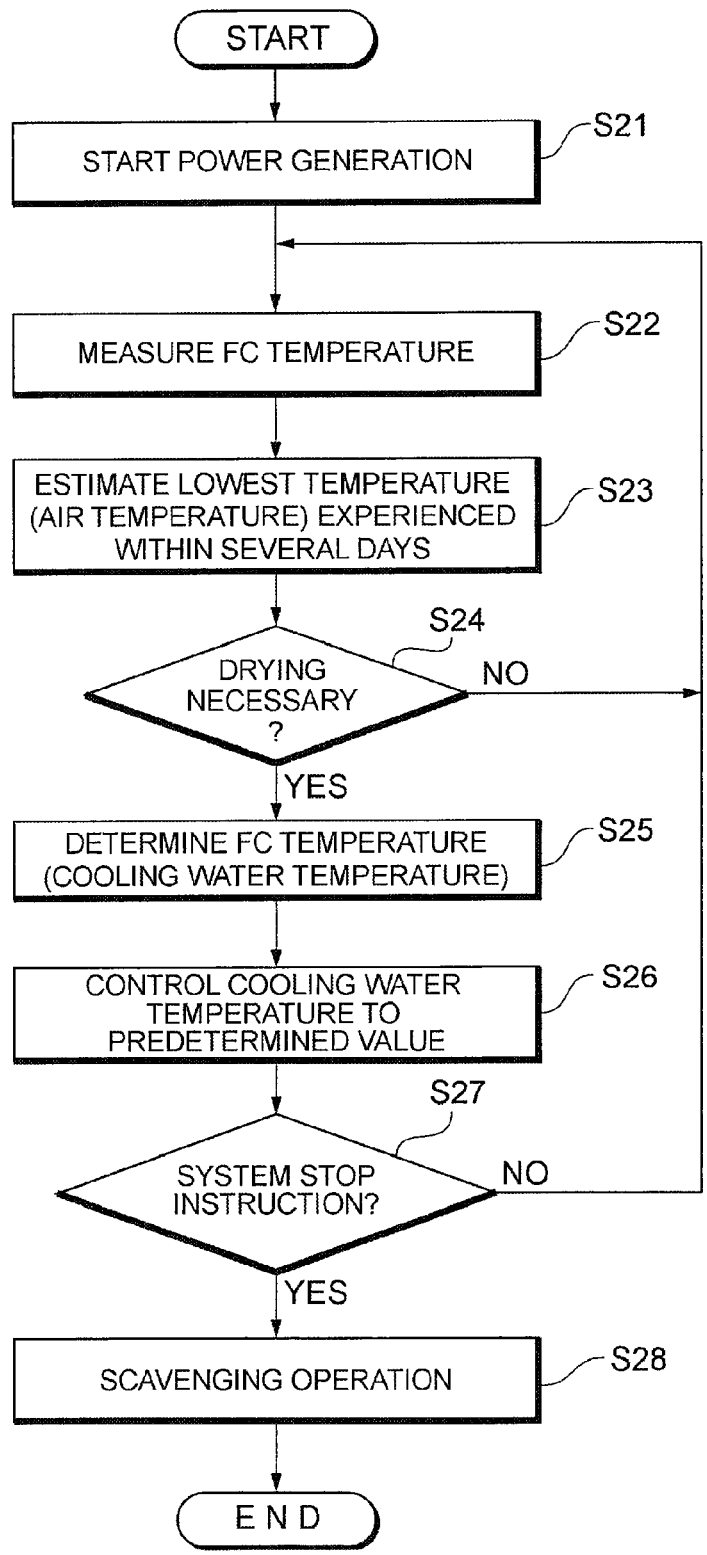
FIG. 5 is a flow chart showing a third control example concerning the stop control of the fuel cell system of the present invention.

On the other hand, as shown by the curve L1, in the third control example, in a case where it is judged that the dry operation is necessary (the step S24 of FIG. 5; YES, a timing $t_0$ of FIG. 7), the dry operation for raising the FC temperature is executed (the step S26 of FIG. 5). In consequence, when the system stop instruction is issued by the user (the step S27 of FIG. 5; YES, the timing $t_1$ of FIG. 7), the FC temperature rises above the FC temperature $T_1$ before the dry operation. In consequence, the FC temperature $T_1$ before the dry operation reaches the target temperature $T_2$ at a timing $t_2$, and a time from the system stop instruction to a time when the temperature reaches the target temperature $T_2$ is shortened as compared with the comparative example.

As described above, according to the third control example, since the dry operation for raising the FC temperature is performed before the system stop instruction, the water content of the fuel cell 2 can be decreased at the time of the system stop instruction. In consequence, the scavenging after the system stop instruction can be ended in a short time, and energy for the scavenging is not necessary or can be saved. Moreover, since the conditions (the dry degree) of the dry operation are determined based on the outside air temperature or the FC temperature at the next start, an appropriate dry operation can be executed in accordance with the situation. Furthermore, the power generation performance of the fuel cell 2 lowers in the low-temperature atmosphere, and hence the FC temperature can be raised to improve the power generation performance. On the other hand, when the outside air temperature is low, a heat exchange efficiency by the radiator 43 improves. Therefore, even when the FC temperature rises with the increase of the output, the fuel cell 2 can easily be cooled.

<Fourth Control Example>

Figure 8:
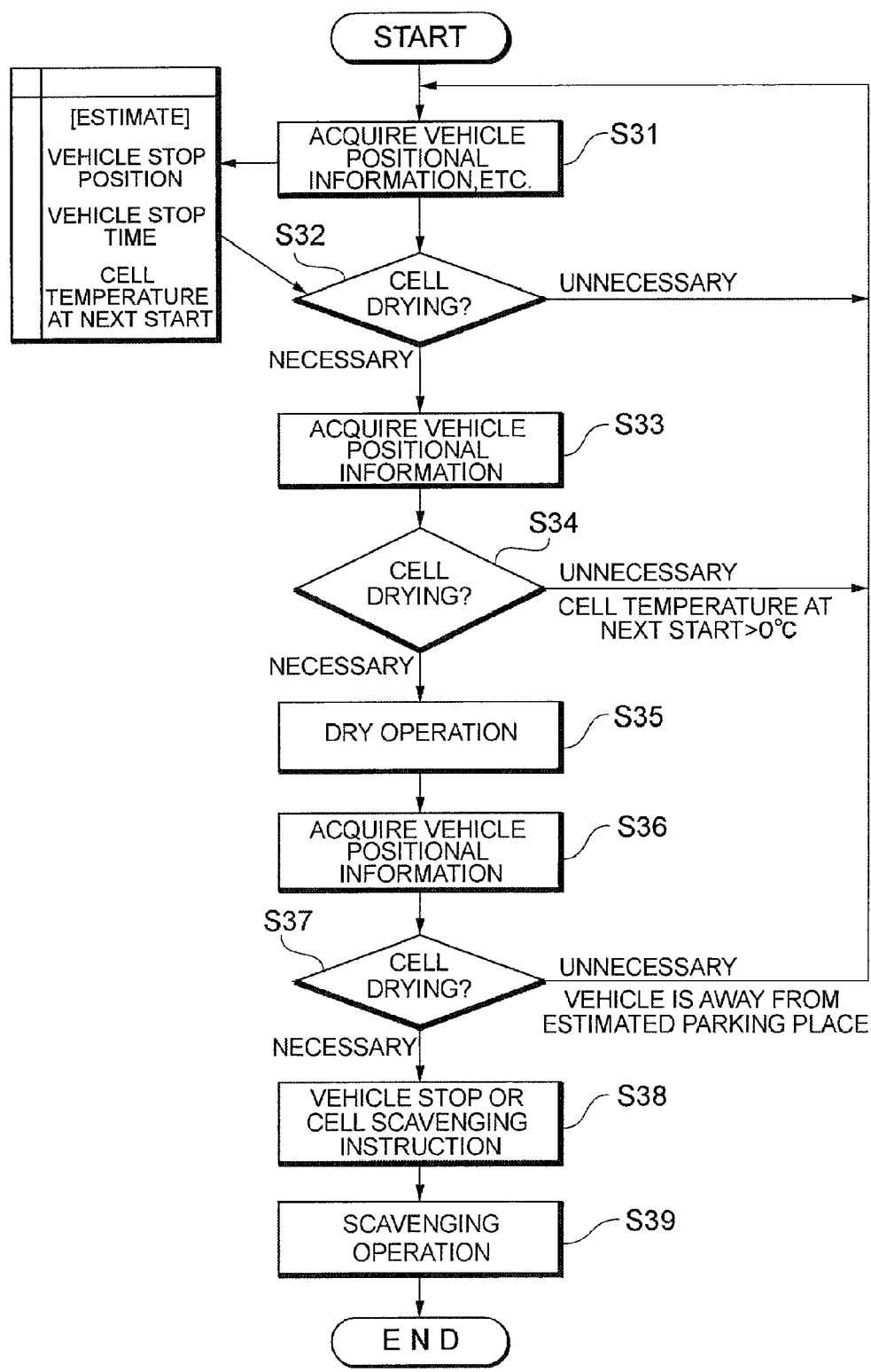
FIG. 8 is a flow chart showing a fourth control example concerning the stop control of the fuel cell system of the present invention.

Next, a fourth control example will be described with reference to FIG. 8. The fourth control example is a modification of the third control example. It is to be noted that in the following description, the detailed description of steps common to those of the above first to third control examples is omitted.

First, in a step S31, vehicle positional information or the like is acquired during the normal operation (step S32). Examples of the acquired information include the outside air temperature data, the FC temperature data, the vehicle speed data, the positioning data and time data such as the season in the same manner as in the step S2 of FIG. 3. Then, the necessity of the drying of the fuel cell 2 is judged based on the acquired data (step S32).

In a case where it is judged based on, for example, the positioning data or the outside air temperature data that the drying of the fuel cell 2 is not necessary (step S32; unnecessary), the flow comes out of a series of processing. On the other hand, in a case where it is judged that the drying is necessary (step S32; necessary), the vehicle positional information as the positioning data is acquired again (step S33). Then, based on this positioning data, the stop instruction predicting section 95 predicts the vehicle stop position and the vehicle stop time of the vehicle 100, and the FC temperature predicting section 98 predicts the FC temperature at the next system start. Based on these prediction results, the judgment unit 94 again judges the necessity of the drying of the fuel cell 2 (step S34).

Here, in a case where it is predicted that, for example, the FC temperature at the next system start exceeds 0° C., it is judged that the drying of the fuel cell 2 is not necessary (step S34; unnecessary), and the flow comes out of a series of processing. On the other hand, in a case where it is predicted that the FC temperature at the next system start is 0° C. or less, it is judged that the drying of the fuel cell 2 is necessary (step S34; necessary), and the dry operation is started (step S35). This dry operation is executed based on the determined dry degree as in, for example, the step S25 of FIG. 5. Afterward, the positioning data is acquired again (step S36), and based on this positioning data, the necessity of the drying of the fuel cell 2 is judged again (step S37).

Here, when the vehicle 100 is away from, for example, the estimated parking place, that is, the vehicle stop position of the vehicle 100 predicted by the stop instruction predicting section 95, it is judged that the dry operation of the fuel cell 2 is not necessary (step S37; unnecessary). In this case, the flow comes out of a series of processing and returns to the normal operation. On the other hand, when the vehicle 100 is going to the estimated parking place, the dry operation of the fuel cell 2 continues (step S37; necessary). Afterward, when the system stop instruction as the instruction for the vehicle stop or a cell scavenging instruction is issued (step S38), the scavenging operation is executed (step S39), and the fuel cell system 1 stops.

According to the above-mentioned fourth control example, an effect similar to that of the first control example can be produced. In particular, when the vehicle 100 is away from the predicted stop position, the operation can be returned to the normal operation.

<Fifth Control Example>

Next, a fifth control example will be described with reference to FIGS. 9 to 11. In the fifth control example, the parking conditions of a place where the vehicle 100 stops by are added as parameters for judging whether or not to execute the dry operation.

Figure 9:
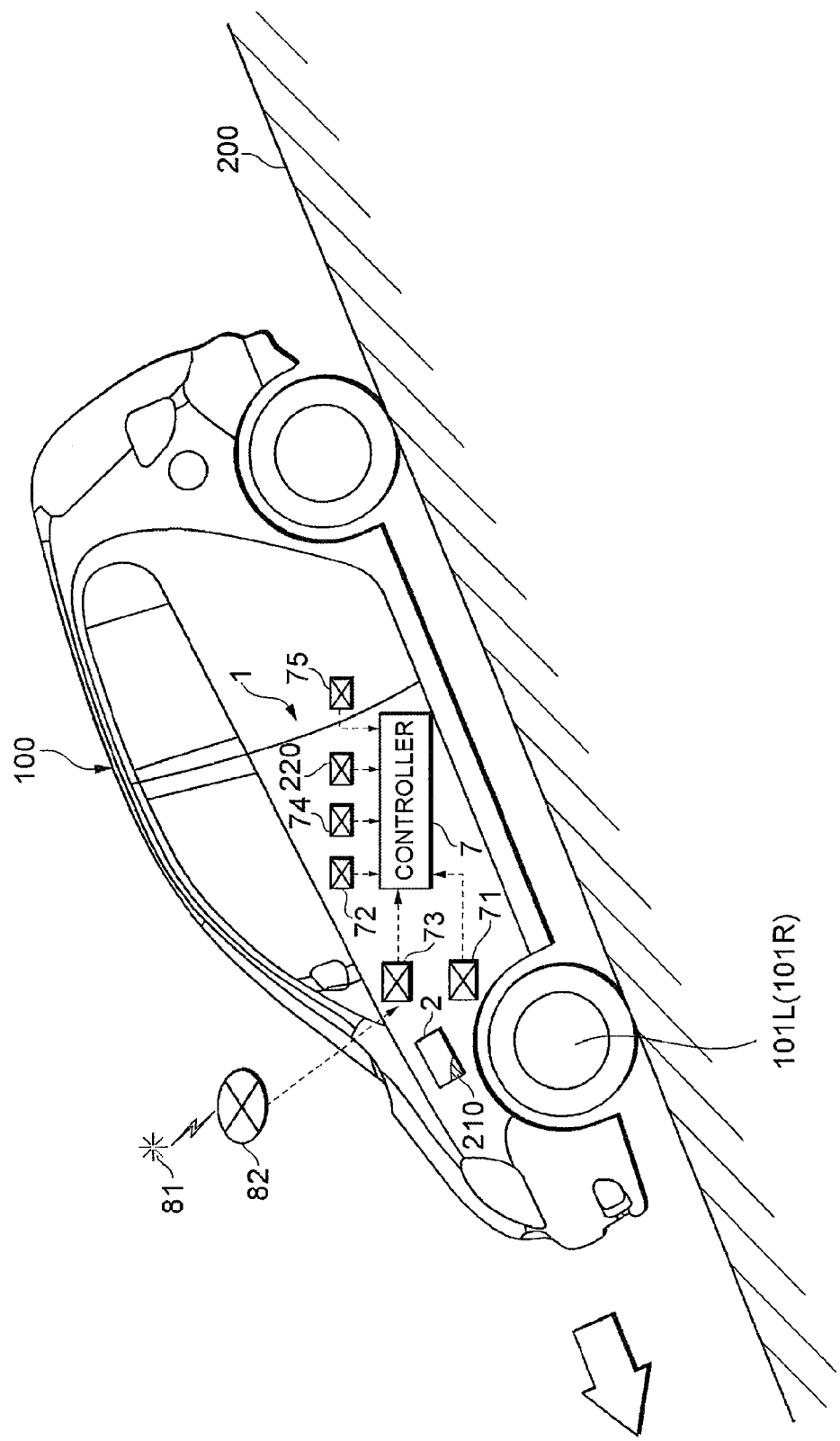
FIG. 9 is a side view of a vehicle on which the fuel cell system of the present invention is mounted, and a diagram showing a characteristic part for explaining the stop control (a fifth control example) of the fuel cell system.

As shown in FIG. 9, when the vehicle 100 is on a tilted road surface 200, the fuel cell 2 horizontally mounted on the vehicle 100 follows the tilt of the road surface 200 and tilts. In a case where a low load operation is performed for a long time while the vehicle 100 tilts, formed water 210 is locally accumulated in the fuel cell 2, and the water discharge properties of the formed water 210 might lower. In particular, when the parking place is present ahead of a long descending slope, the fuel cell system 1 performs the low load operation for a long time. Therefore, in the fuel cell 2, the formed water 210 is easily accumulated in a vehicle forward direction. Moreover, in a case where the vehicle 100 is parked on the road surface 200 of a tilted place, even when the fuel cell 2 has an equal water content, the formed water 210 is easily locally accumulated, as compared with a case where the vehicle is parked on the flat road surface 200. This condition is disadvantageous for a low-temperature start.

Therefore, before parking the vehicle 100, it is preferable the tilt state of the vehicle 100 in the parking place is predicted and that the operation is performed so that the formed water 210 is not easily accumulated, The fifth control example concerning the stop control of the fuel cell system 1 is suitable for executing such an operation.

Figure 10:
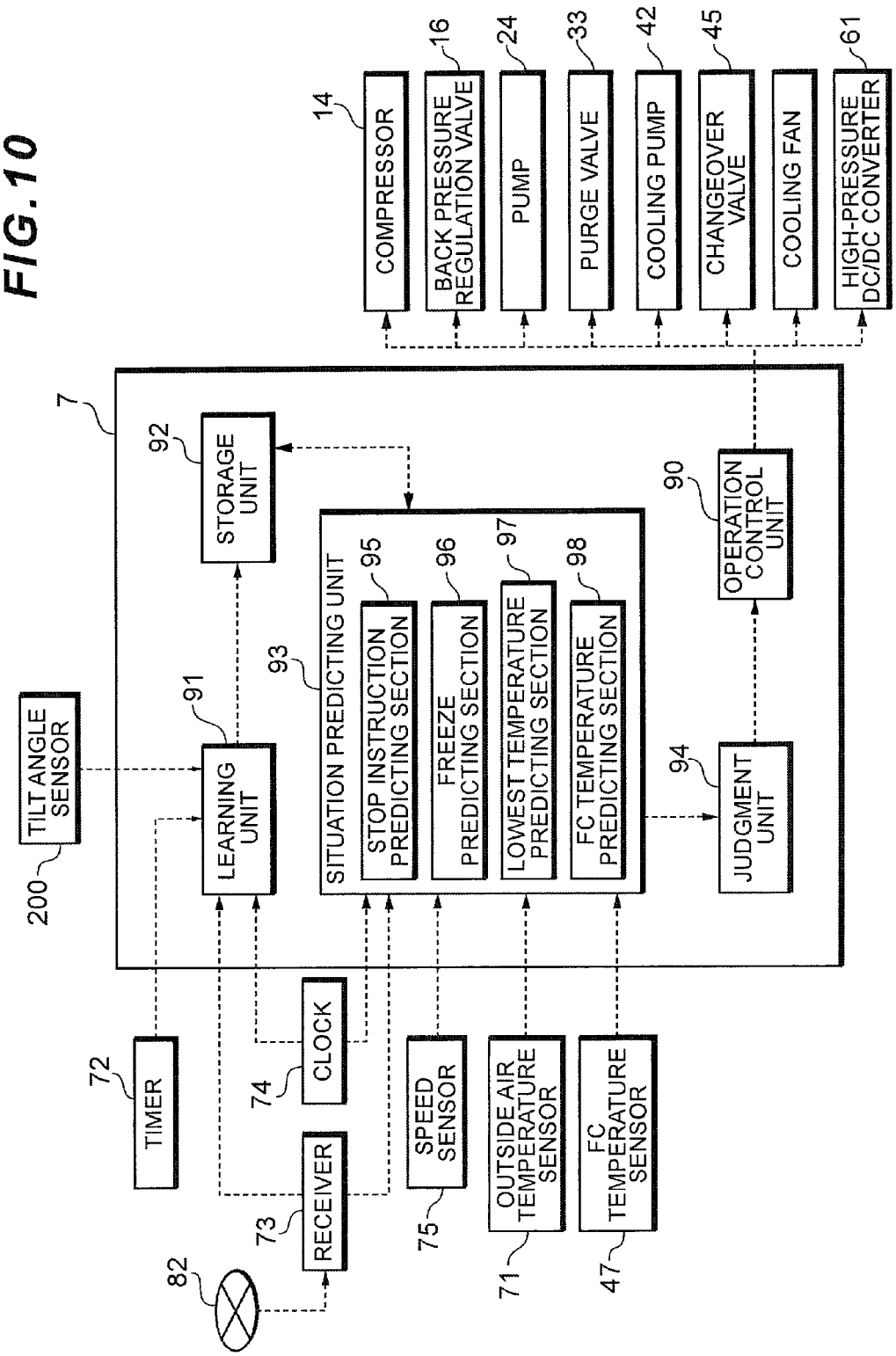
FIG. 10 is a block diagram showing a characteristic part for executing the fifth control example of the present invention.

As shown in FIGS. 9 and 10, as a constitution for executing the fifth control example, the fuel cell system 1 has a tilt angle sensor 220 which detects the tilt state of the vehicle 100. As the tilt angle sensor 220, a known servo type sensor or the like may be used and can be mounted on the vehicle 100. There is not any special restriction on the tilt angle sensor 220, as long as the tilt angle of the vehicle 100 in the front-to-rear direction (the traveling direction) of the vehicle 100, that is, a pitch angle can be detected. In addition, as the tilt angle sensor 220, there may be used a sensor which detects the tilt angle (the roll angle) of the vehicle 100 in the horizontal direction (the vehicle width direction) of the vehicle 100.

It is to be noted that as a method of detecting the tilt state of the vehicle 100, a method of detecting the gradient value of the road surface 200 may be adopted instead of using the tilt angle sensor 220. Such a gradient value detecting method is known and hence is not described in detail, and examples of the method include a method of acquiring information on the gradient value in the parking place (including the predicted parking place) of the vehicle 100 from the receiver 73 as a navigation device.

As shown in FIG. 10, the data from the timer 72, the receiver 73 and the clock 74 are input into the learning unit 91, and the data from the tilt angle sensor 220 is also input. Therefore, the learning unit 91 learns the stop place of the vehicle 100, the stop time at the stop place, and the tilt angle of the vehicle 100 with respect to the road surface 200 at the stop place, to grasp the user's use tendency (the operation pattern). It is to be noted that the stop place of the vehicle 100 is a concept including the parking place of the vehicle 100, and the stop time is a concept including the parking time of the vehicle 100.

The storage unit 92 stores the user's use tendency grasped by the learning unit 91. The storage unit 92 stores, for example, a place (e.g., home, office or the like) where the user often parks the vehicle and stops by, and also stores the environment of the place, that is, the tilt angle of the vehicle 100. At this time, the absolute value of the tilt angle of the vehicle 100 is stored. This is because it is difficult to predict the parking direction of the vehicle 100 with respect to the road surface 200. Moreover, as described above, the storage unit 92 may store the timing or the time zone in association with the parking place and update the data based on the latest action, and may further have a map weighed by the frequency of the vehicle stop.

The flow of the fifth control example will be described.

Figure 11:
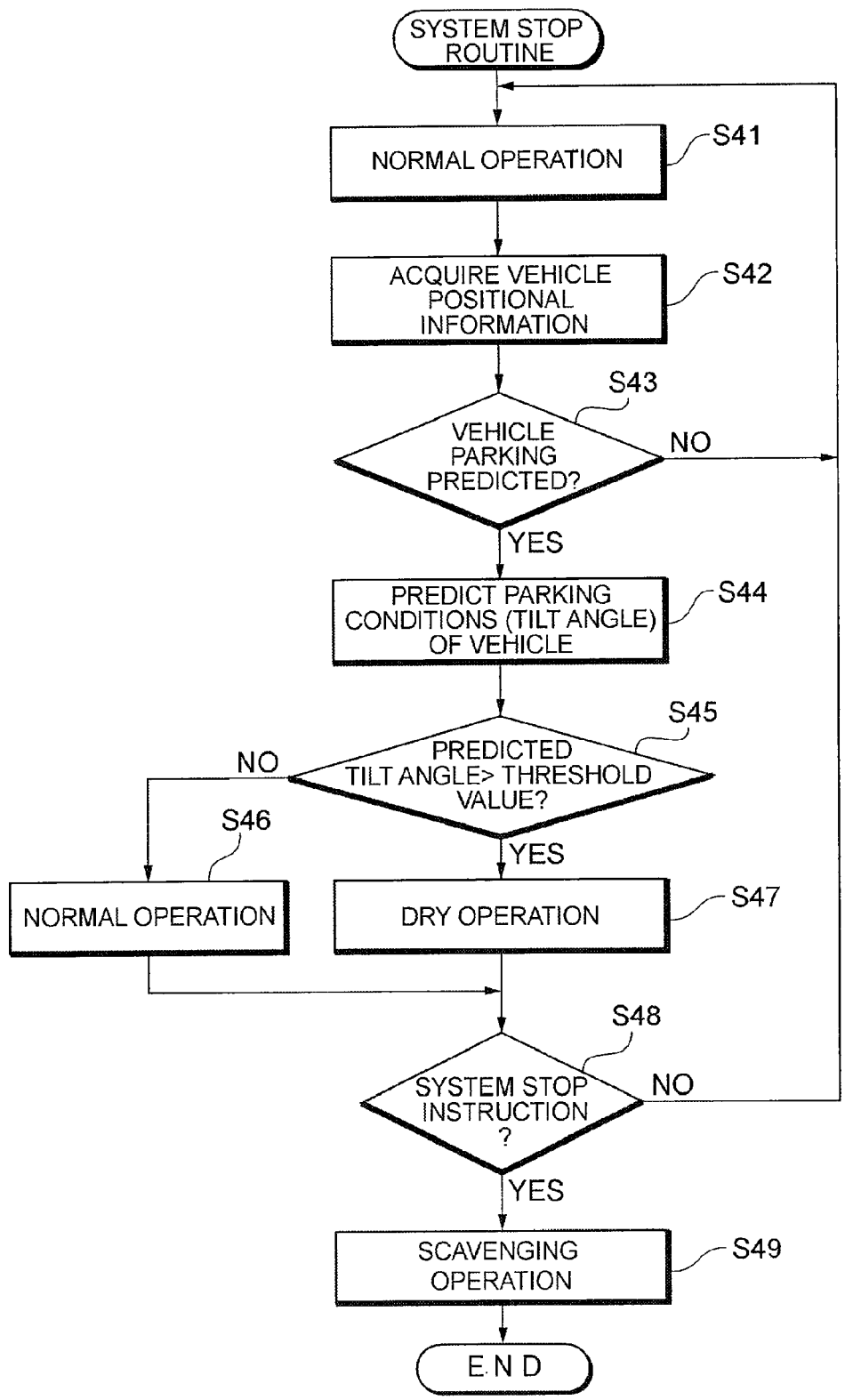
FIG. 11 is a flow chart showing the fifth control example of the present invention.

As shown in FIG. 11, when the fuel cell system 1 performs the normal operation (step S41), the vehicle positional information or the like is acquired during the normal operation (step S42). Examples of the acquired information include the outside air temperature data, the FC temperature data, the vehicle speed data, the positioning data and time data such as the season in the same manner as in the step S2 of FIG. 3. Then, based on this acquired data, the situation predicting unit 93 predicts whether or not the vehicle 100 is parked (step S43). This prediction is performed by the stop instruction predicting section 95, and the stop instruction predicting section 95 predicts that the vehicle 100 is parked to stop the fuel cell system 1, with reference to the position data, and the user's use tendency data stored in the storage unit 92.

Consequently, in a case where it is predicted that the vehicle 100 is not parked (step S43; NO), the normal operation is continued (step S41). On the other hand, in a case where it is predicted that the vehicle 100 is parked (step S43; YES), the situation predicting unit 93 predicts the parking place of the vehicle 100 and the tilt angle of the vehicle 100 at the place, from the user's use tendency data and the present positioning data (step S44). Then, the judgment unit 94 judges whether or not this predicted tilt angle is larger than a threshold value.

When the predicted tilt angle is the threshold value or less (step S45; NO), there is an only low possibility that the formed water is locally accumulated in the parked vehicle 100. Therefore, the judgment unit 94 judges that the normal operation should be continued (step S46), and the unit waits for the system stop instruction (step S48). It is to be noted that although not shown, even in a case where there is the only low possibility that the formed water is locally accumulated, the judgment unit 94 can generally judge from the prediction result of the freeze predicting section 96 or the like that the operation should be switched to the dry operation.

When the predicted tilt angle exceeds the threshold value (step S45: YES), there is the high possibility that the formed water is locally accumulated in the parked vehicle 100. In this case, the judgment unit 94 judges that the dry operation should be executed, and the dry operation is executed (step S47). In consequence, the water content of the fuel cell 2 is decreased as compared with the normal operation, and hence the formed water can be prevented from being locally accumulated not only after the parking but also during the running along the descending slope.

Afterward, in a case where any system stop instruction is not issued even after the elapse of a predetermined time or it is predicted that any system stop instruction is not issued (step S48; NO), the flow comes out of the processing and returns to the normal operation. On the other hand, when the vehicle 100 is parked and the system stop instruction is issued within the predetermined time (step S48; YES), a scavenging operation (step S49) is executed. In consequence, the fuel cell system 1 and the vehicle 100 stop to prepare for the next start.

According to the above-mentioned fifth control example, the environment of the parking place (the tilt angle of the vehicle 100) can be predicted in advance, to execute the dry operation before the system stop instruction. Therefore, it is possible to obtain a state in which the water is not easily accumulated in the fuel cell 2 before the parking, and the next system start can stably be performed.

In addition, it is also considered that even when the vehicle 100 reaches the parking place, the ignition switch is not turned off, and the vehicle 100 performs an idling operation. When the idling operation is performed in the vehicle 100 on the tilted road surface 200 for a long time, the formed water might locally be accumulated. To prevent this problem, an alarm may be issued to the operator (the user) so that the idling cannot be performed for a long time after the parking. Therefore, the controller 7 refers to the information from the tilt angle sensor 220 even after the stop of the vehicle 100, the operation control unit 90 limits the operation conditions of the fuel cell system 1 so as to avoid the operation in which the formed water is easily accumulated, and the alarm may be issued to the operator.

<Modification>

In the above first to fifth control examples, the scavenging operation is performed after the system stop instruction, but the present invention is applicable to an example in which any scavenging operation is not performed.

The invention claimed is:

1. A fuel cell system comprising:
a fuel cell; and
a controller programmed to control the execution of a normal operation and a dry operation which decreases the water content of the fuel cell as compared with the normal operation,
wherein the controller includes a stop instruction predicting section which predicts a system stop instruction for stopping the operation of the fuel cell system, and based on the prediction result of the stop instruction prediction section the controller is programmed to execute the dry operation before the system stop instruction so that the water content of the fuel cell is decreased at a time of the system stop instruction as compared with the normal operation in a case where it is predicted that the system stop instruction will be issued, and is programmed to continue the normal operation in a case where it is predicted that the system stop instruction will not be issued,
wherein the system stop instruction is issued by the user's OFF operation of an ignition switch.

2. The fuel cell system according to claim 1, wherein the stop instruction predicting section predicts the system stop instruction based on the position of a mobile body on which the fuel cell system is mounted and the use tendency of a user who uses the mobile body.

3. The fuel cell system according to claim 2, wherein the controller includes a learning unit which learns a stop place of the mobile body and a stop time at the stop place to grasp the use tendency of the user.

4. The fuel cell system according to claim 1, wherein after executing the dry operation based on the prediction result of the stop instruction prediction, the controller switches the dry operation to the normal operation in a case where the stop instruction predicting section predicts that the system stop instruction is not issued.

5. The fuel cell system according to claim 1, wherein after executing the dry operation based on the prediction result of the stop instruction prediction, the controller switches the dry operation to the normal operation when the system stop instruction is not issued within a predetermined time.

6. The fuel cell system according to claim 1, wherein the controller comprises a freeze predicting section which predicts the freezing of the fuel cell at the system stop or the next system start, and
based on the prediction result of the freeze predicting section, the controller is programmed to execute the dry operation before the system stop instruction in a case where it is predicted that the freezing of the fuel cell occurs, and continues the normal operation in a case where it is predicted that the freezing of the fuel cell does not occur.

7. The fuel cell system according to claim 6, wherein the freeze predicting section predicts the freezing of the fuel cell at the system stop or the next system start based on at least one of a position of the fuel cell system, an outside air temperature, a predicted lowest temperature experienced within several days after the system stop, and a calendar.

8. The fuel cell system according to claim 1, wherein the controller comprises a prediction section which predicts the tilt state of a mobile body on which the fuel cell system is mounted at the stop place of the mobile body, and based on the prediction result of the predicting section, the controller is programmed to execute the dry operation before the system stop instruction.

9. The fuel cell system according to claim 8, wherein the controller includes a learning unit which learns a stop place of the mobile body, a stop time at the stop place, and a tilt angle of the mobile body with respect to a road surface at the stop place to grasp the use tendency of a user, and the prediction section predicts the stop place of the mobile body the tilt state of the mobile body at the stop place based on the use tendency of the user.

10. The fuel cell system according to claim 1, wherein the controller limits the amount of the power to be generated by the fuel cell as compared with the normal operation, to execute the dry operation.

11. The fuel cell system according to claim 1, wherein the controller raises the temperature of the fuel cell as compared with the normal operation, to execute the dry operation.

12. The fuel cell system according to claim 11, further comprising:

a refrigerant piping system which supplies a refrigerant to the fuel cell, wherein during the dry operation, the fuel cell is allowed to generate the power while the amount of the fuel cell to be cooled by the refrigerant is decreased.

13. The fuel cell system according to claim 1, further comprising:

an oxidizing gas piping system which supplies an oxidizing gas to the fuel cell, wherein the controller changes at least one of a flow rate, a pressure, a temperature, and a dew point of the oxidizing gas as compared with the normal operation, to execute the dry operation.

14. The fuel cell system according to claim 1, further comprising:

a fuel gas piping system which supplies a fuel gas to the fuel cell, wherein the controller changes at least one of a flow rate, a pressure, a purge frequency, and a dew point of the fuel gas as compared with the normal operation, to execute the dry operation.

15. The fuel cell system according to claim 1, wherein the controller executes the dry operation before the system stop instruction based on data acquired during the normal operation.

* * * * *